United States Patent [19]
Krohn

[11] 3,984,962
[45] Oct. 12, 1976

[54] MAST STRUCTURE AND COMPOSITE STRUCTURAL FITTING THEREFORE

[75] Inventor: Fritz F. W. Krohn, Rancho Santa Fe, Calif.

[73] Assignee: General Dynamics Corporation, San Diego, Calif.

[22] Filed: Nov. 28, 1975

[21] Appl. No.: 636,244

[52] U.S. Cl. .............................. 52/649; 403/191; 403/192; 403/310; 403/314
[51] Int. Cl.² ..................... E04H 12/02; F16B 7/08; F16D 1/02
[58] Field of Search ............... 52/649, 648, 638; 403/300, 310, 314, 191, 192; 182/179

[56] References Cited
UNITED STATES PATENTS

| | | | |
|---|---|---|---|
| 441,445 | 11/1890 | Shaw | 403/314 X |
| 513,609 | 1/1894 | Crolley | 403/310 |
| 1,738,667 | 12/1929 | Reeves | 403/314 X |
| 3,656,269 | 4/1972 | Witschel | 52/638 |
| 3,776,650 | 12/1973 | Zenhausern | 403/191 |
| 3,788,926 | 1/1974 | Weisinger | 156/161 X |
| 3,914,060 | 10/1975 | Miller et al. | 403/192 |

FOREIGN PATENTS OR APPLICATIONS

| | | | |
|---|---|---|---|
| 206,614 | 12/1959 | Austria | 52/648 |
| 748,394 | 7/1933 | France | 52/648 |
| 367,152 | 1/1923 | Germany | 403/310 |
| 331,091 | 10/1935 | Italy | 403/191 |
| 376,619 | 5/1964 | Switzerland | 403/191 |
| 2,189 | 1/1884 | United Kingdom | 403/314 |

Primary Examiner—Price C. Faw, Jr.
Assistant Examiner—Leslie Braun
Attorney, Agent, or Firm—John R. Duncan

[57] ABSTRACT

A fitting for connecting a structure to an advanced composite tube, where the tube consists of high strength fibers embedded in a supporting matrix material. The fitting comprises a narrow sleeve bonded to a composite tube, split rings engaging the ends of the sleeve and overlying threaded rings fastened to the structure to be connected to the tubes, said rings when threaded together fixedly engaging said split rings. This assembly provides a secure, removable fitting while avoiding penetrations in the composite tube.

10 Claims, 5 Drawing Figures

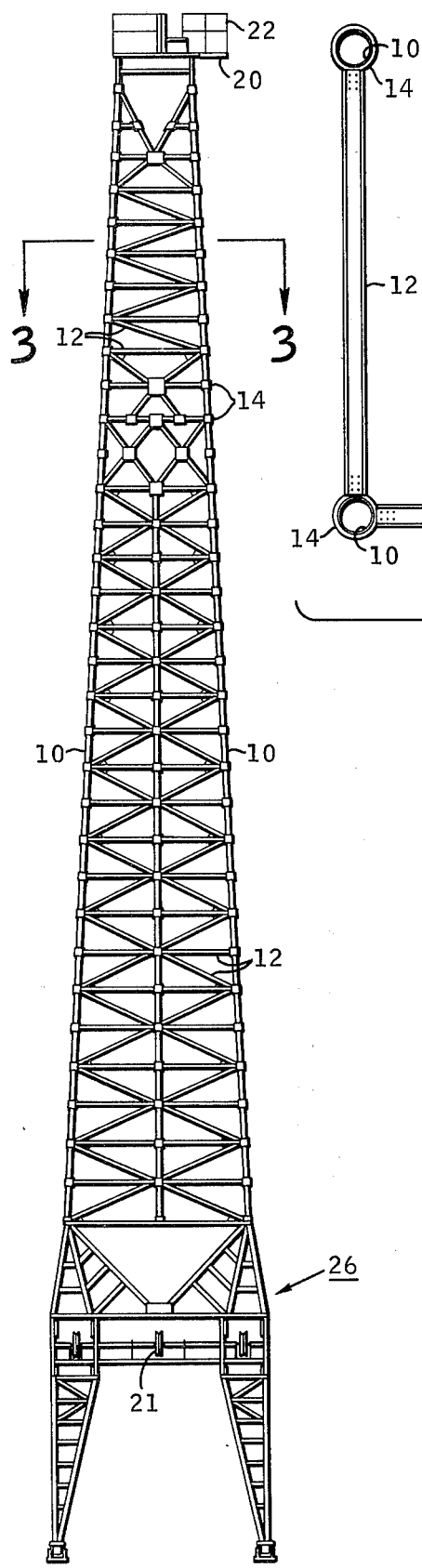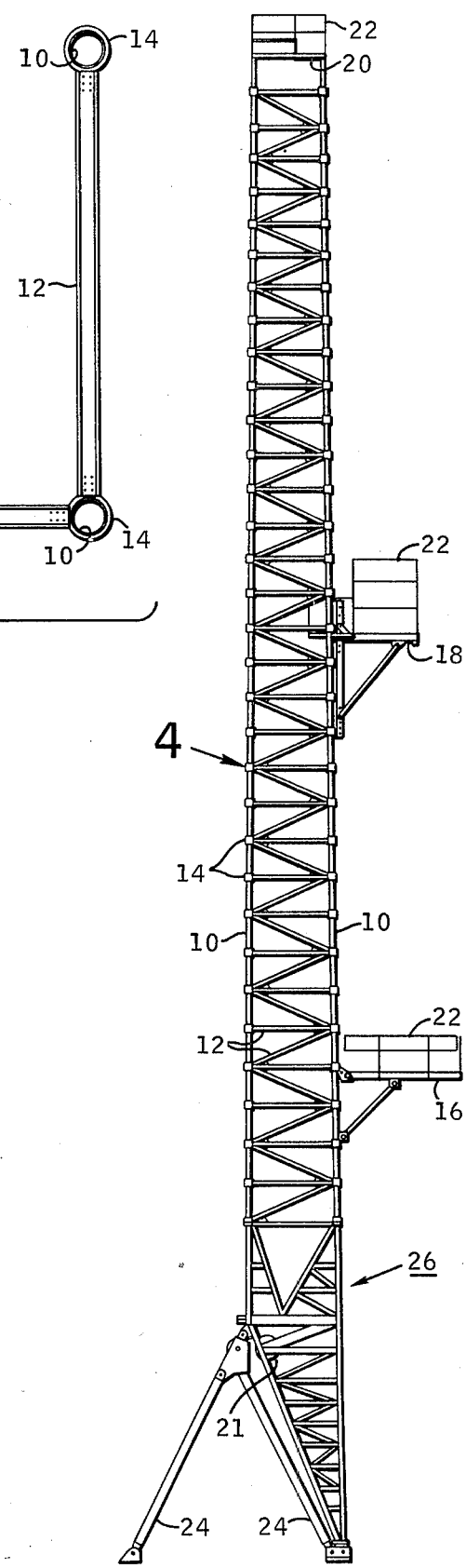
FIG. 1    FIG. 3    FIG. 2

A MAST STRUCTURE AND COMPOSITE STRUCTURAL FITTING THEREFORE

BACKGROUND OF THE INVENTION

This invention relates in general to structural attachment fittings and, more specifically, to a fitting assembly providing connection between composite tubes and other structures.

Advanced composite materials are coming into use in applications requiring very high strength-to-weight ratios. These composite materials comprise very high strength fibers, such as graphite and boron fibers, embedded, often in a unidirectional parallel array, in a matrix material such as a synthetic resin or aluminum. Because of the high price and fabrication limitations, these materials have been primarily used in aerospace applications, sporting goods and other applications where their outstanding physical properties are required.

One potential area in which the high strength and light weight of advanced composites would be valuable is in exploration for oil. Drilling towers, derricks and other equipment must often be taken into uninhabited jungle, desert or mountainous areas far from roads. Presently, it is necessary to build roads at great cost in time and money to bring in this equipment. Much of the equipment is too heavy for airlift by helicopter unless broken down, and on-site reassembly facilities are often non-existent. Much of this equipment, if fabricated from advanced composites could be airlifted in complete, ready-for-use form.

Unfortunately, many of these structures cannot be fabricated from composite materials by conventional methods. For example, these materials cannot be welded, riveted or bent by the methods used for metals. Bolt or rivet assembly is undesirable because of the high localized stresses and the loss of strength due to fiber discontinuity at the fastener holes. Attempts to overcome these problems by joining the elements of the entire structure by bonding at a factory have not been entirely successful. Once assembled, the structure cannot be easily changed, modified or repaired.

Thus, there is a continuing need for improved composite structures and fittings for use in oil well derricks, platforms, etc.

OBJECTS OF THE INVENTION

It is, therefore, an object of this invention to provide a composite structural fitting system overcoming the above-noted problems.

Another object of this invention is to provide a high strength fitting for connecting elements of a composite structure.

A further object of this invention is to provide a composite structural fitting permitting rapid assembly and disassembly of the structure.

A further object of this invention is to provide an oil well mast or derrick combining high strength with light weight.

Yet another object of this invention is to provide an improved method for assembling high strength composite structures.

SUMMARY OF THE INVENTION

The above objects, and others, are accomplished in accordance with this invention by a combination of a tubular member having attachment means for truss fitting or other structures. The tubular members consist of a composite of high strength fibers embedded in a supporting matrix. The tubular members include collars bonded to the tubular members at the attachment points. A pair of split rings engage the ends of each of the collars and extend radially outwardly slightly of the collars. A tubular main fitting body overlies the collar with an inwardly extending flange at one end of the fitting body engaging one split ring. A nut threadedly engages a threaded outer portion at the second end of the fitting body, with an inwardly extending flange engaging the second split ring. As the nut is tightened, the flanges are drawn together, pressing the split rings against the ends of the collar to secure the fitting in place. The fitting may be removed by unthreading the nut, sliding the fitting body and nut apart, then opening the split rings to remove them past the tubular member.

BRIEF DESCRIPTION OF THE DRAWING

Details of the invention will be further understood upon reference to the drawing, which illustrates preferred embodiments of the invention. In the drawing:

FIG. 1 is a front elevation view of a mast utilizing the fitting of this invention;

FIG. 2 side elevation view of the mast of FIG. 1;

FIG. 3 is a sectional view taken on line 3—3 in FIG. 1;

DETAILED DESCRIPTION OF THE INVENTION

Figure 5:
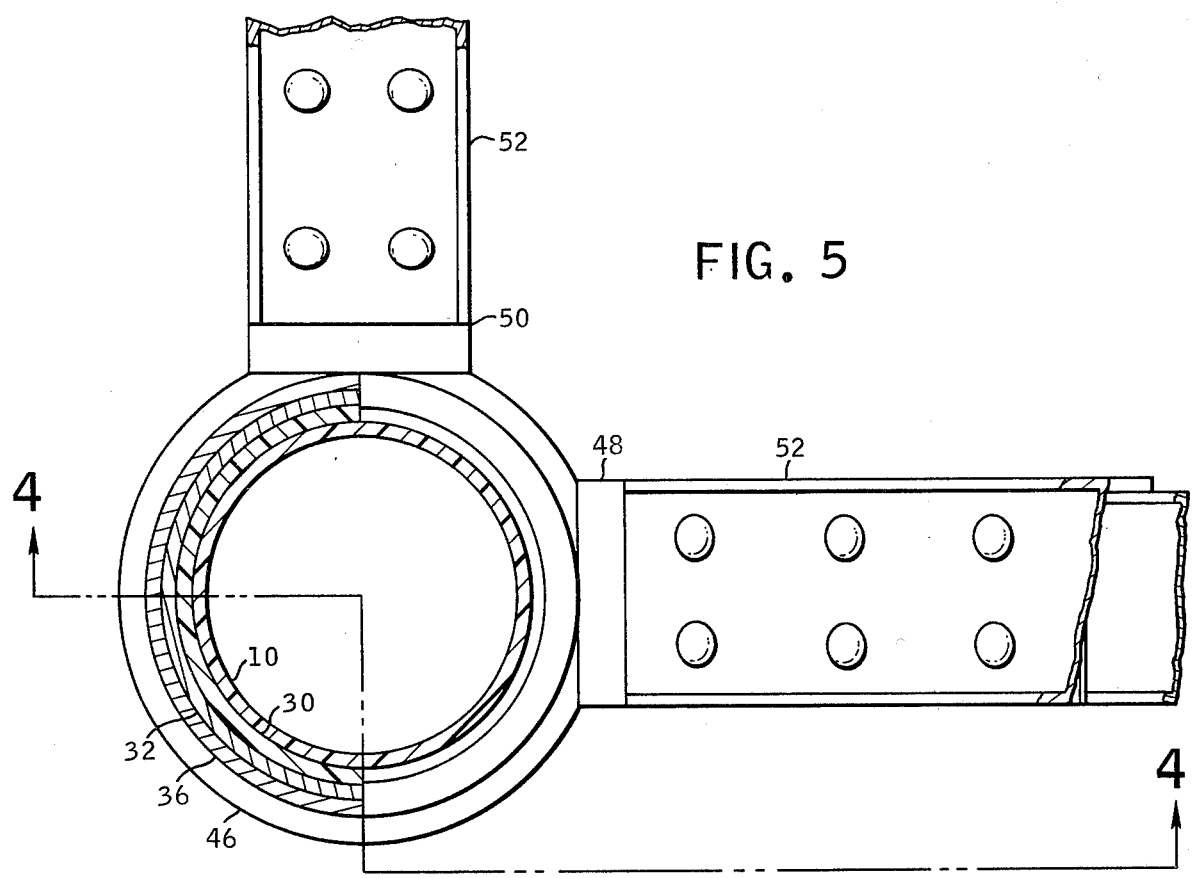
FIG. 5 is a sectional view taken on line 5—5 in FIG. 4.

Referring now to FIGS. 1 and 2, which are front and right elevation views, there is seen a typical mast or tower suitable for use in oil exploration. This mast is designed and assembled using composite materials and the novel composite structural fitting of this invention. This mast has a generally U-shaped cross-section, as seen in FIG. 3.

The main structure of the mast consists of a plurality of generally parallel or nearly parallel tubes 10 which are made of light weight but very strong fibers in a supporting matrix. Most of the fibers in the tubes are arranged in a parallel contiguous configuration with the fibers parallel to the tube axis. If desired, some fibers may lie in other directions, and woven fabric layers may be added. While the tubes are generally cylindrical, they may be tapered or telescoped, if desired. Typical fiber/matrix combinations include graphite or Tedlor (a high strength synthetic resin fiber available from E. I. du Pont de Nemours) fibers in a thermosetting (such as epoxy or polyimide) or thermoplastic (such as nylon) resin matrix, boron fibers in an aluminum matrix, or a combination of these. For best results, the fibers should have a Young's modulus of at least about $20 \times 10^6$ psi. These tubes have stiffness and strength characteristics equaling or far exceeding those of steel tubes often used in such structure, but at a fraction of the weight.

The cross pieces 12 and other members making up the mast truss structure are fastened to tubes 10 by a plurality of structural fittings 14. Accessory and auxiliary devices, such as platforms 16, 18 and 20 are attached to tubes 10 by other fittings 14. Various sheaves and other devices such as sheaves 21 may be secured to the truss structure as required. Other sheaves, ladders, etc. are often used. These have been omitted from the drawing for clarity. The attachments and accessories may be fabricated from any suitable material. Light weight, strong structures are preferred. For example the floors of platforms 16, 18 and 20 may be a honeycomb or isogrid structure, combining high strength with low weight. Railings 22, ladders, etc., may be made from high strength aluminum. Supporting legs 24 could be fabricated from any suitable material such as tubes comprising boron fibers in an aluminum matrix with titanium end fittings, fabricated as described in U.S. Pat. No. 3,788,926 assigned to the assignee of this application. The lower, base portion 26 of the tower to which the tube-and-truss mast is secured may typically be fabricated from aluminum, steel or composites of the sort used in the mast.

Figure 4:
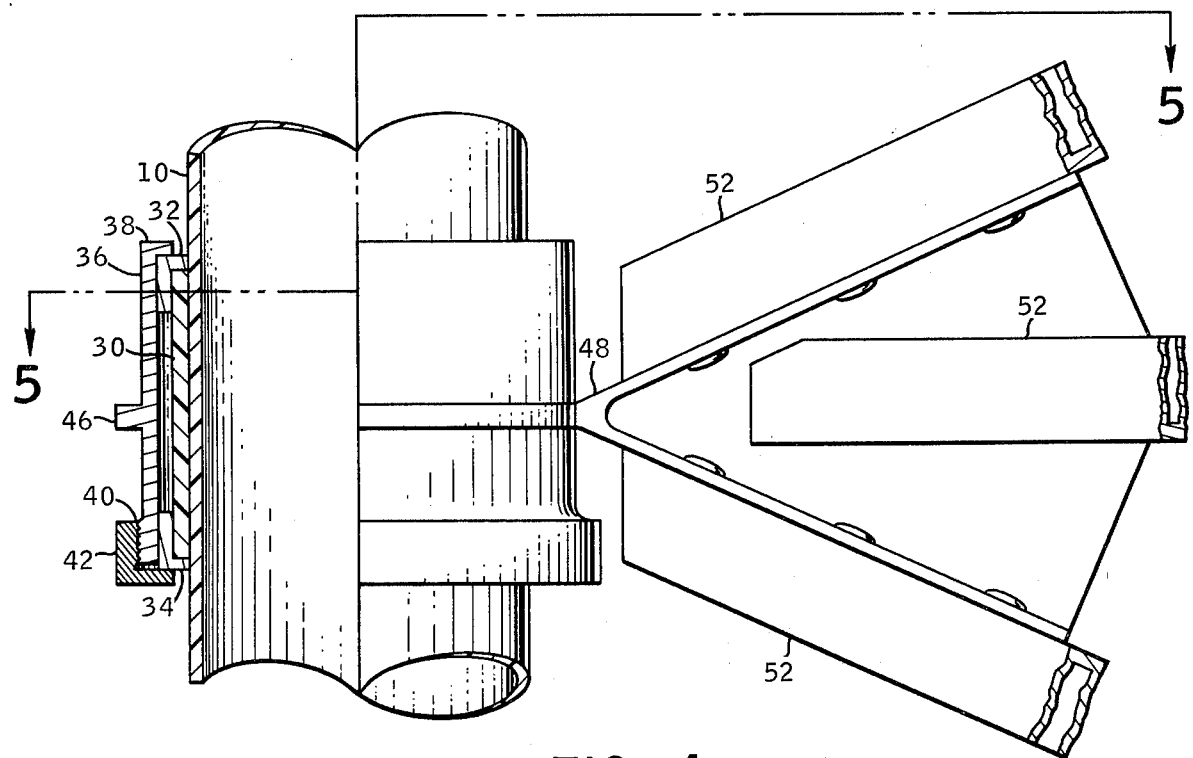
FIG. 4 is a detail view partly in section along line 4—4 in FIG. 5 taken at "A" in FIG. 2, showing details of the novel fitting of this invention.

Details of a typical composite structural fitting are illustrated in FIGS. 4 and 5. FIG. 4 is an elevation view, partly in section along line 4—4 in FIG. 5, while FIG. 5 is a horizontal sectional view taken approximately on line 5—5 in FIG. 4.

A collar 30 is bonded to the outer surface of tube 10 at the location selected for attachment of a structural fitting. For example, collar 30 may be two half-rings adhesively bonded to tube 10. The half-rings could be fabricated from any suitable material, such as aluminum, steel, or the fiber-matrix compositon from which the tubes are fabricated. Alternately, tape comprising high strength fibers in a supporting matrix, such as graphite/epoxy pre-preg, may be wrapped around tube 10 and co-cured in place while the tube lay-up is cured.

A pair of split rings 32 and 34, which may be fabricated from steel, aluminum or any other suitable material, are spread apart and slipped over tube 10 above and below collar 30. Each ring has a generally L-shaped cross-section, with an inwardly extending flange abutting an end of collar 30 and a tubular portion overlying the end portions of collar 30.

A tubular main fitting body 36 is slipped over one end of tube 10 and moved to the position shown in FIG. 4. Main fitting 36 will slip over any collars 30 spaced along tube 10 which do not have a split ring 32 in place. Main fitting 36 has an inwardly extending flange 38 which abuts split ring 32. The outer tubular surface at the other end 40 of fitting 36 is threaded to receive nut 42. Nut 42 is internally threaded to engage threaded end 40 of fitting 36 and has an inwardly extending flange abutting split ring 34. Nut is brought into position by slipping it over the end of tube 10 and any collars 30 between the tube end and the selected location. Nut 42 is tightened in place, drawing split rings 32 and 34 together to secure the fitting in place.

Any suitable structure is secured to main fitting body 36. In the embodiment shown, a ring 46 is secured, such as by welding, to fitting body 36 and a V-shaped truss supports 48 and 50 are welded to ring 46. A plurality of selected truss members 52 are bolted or otherwise fastened to supports 50. Of course, any other truss members, platform supports, etc. may be fastened in any suitable manner to fitting body 36.

Each fitting can be easily removed and replaced by removing other fittings between the selected fitting and one end of tube 10, then unthreading nut 42, repositioning nut 42 from main body 36, spreading and removing split rings 32 and 34, sliding nut 42 and body 36 off the tube over any intermediate collars 30, then reassembling the other fittings.

While certain specific materials and configurations were described in the above description of a preferred embodiment, other materials and arrangements, as described above, may be used with similar results. Other applications, variations and ramifications of this invention will occur to those skilled in the art upon reading this specification. These are intended to be included within the scope of this invention, as defined in the appended claims.

I claim:

1. A mast suitable for use in drilling oil wells which comprises:
  a plurality of elongated tubes arranged in a generally adjacent and coextensive arrangement;
  each of said tubes comprising parallel contiguous high strength fibers running substantially parallel to the tube axis, said fibers embedded in a supporting matrix;
  a plurality of spaced collars bonded to the exterior of each tube;
  first and second split rings installed adjacent to the ends of each of said collars contiguous with the wall of said tube, each of the first and second split rings adapted to engage an end of said collar and extend radially outwardly beyond said collar;
  a tubular main fitting body overlying each collar, having an inwardly extending flange at one end overlapping and engaging said first split ring, the outer surface of the other end of said fitting being externally threaded;
  an internally threaded nut adapted to engage the main fitting threads; said nut having an inwardly extending flange overlapping and engaging said second split ring, so that as said nut and main fitting are threaded together, said main fitting flange and nut flange are drawn together, pressing the split rings against said collar and securing said fitting in place on said tube and;
  structural means fastened to various of said main fitting bodies, to connect fittings on adjacent tubes together in a high strength, truss-like arrangement.

2. The mast according to claim 1 wherein said fibers have a Young's modulus of at least about $20 \times 10^6$ psi.

3. The mast according to claim 2 wherein said fibers comprise graphite and said matrix is a thermoplastic resin.

4. The mast according to claim 2 wherein said fibers comprise boron and said matrix comprises aluminum.

5. The mast according to claim 1 wherein said tubes and collars comprise graphite fibers in a thermosetting resin matrix and said collars being bonded to said tubes by co-curing the collar resin simultaneously with the tube resin.

6. A structural fitting for removably connecting structures to composite tubes which comprises;
  a thin tubular collar bonded to the exterior of a composite tube, said tube comprising high strength fibers embedded in a supporting matrix;
  a pair of split rings installed above and below said collar in contact with the external wall of said tube, each of the first and second split rings adapted to engage one of the circular ends of said collar and extend radially outwardly beyond said collar;
  a tubular main fitting body overlying said collar, having inwardly extending flange at one end overlapping and engaging said first split ring, and having external threads on the outer tubular surface at the other end; and an internally threaded nut adapted to engage said threads on said main fitting body and having an inwardly extending flange overlapping and engaging said second split ring, whereby threading said nut onto said main fitting body draws said main fitting body and nut flanges together, pressing said split rings against said collar ends and secures said fitting in place on said tube.

7. The fitting according to claim 6 wherein said fibers have a Young's modulus of at least about $20 \times 10^6$ psi.

8. The fitting according to claim 7 wherein said fibers comprise graphite and said matrix is a thermoplastic resin.

9. The fitting according to claim 7 wherein said fibers comprise boron and said matrix comprises aluminum.

10. The fitting according to claim 6 wherein said tubes and collars comprise graphite fibers in a thermosetting resin matrix and said collars being bonded to said tubes by co-curing the collar resin simultaneously with the tube resin.

* * * * *